(12) United States Patent
Matsumoto et al.

(10) Patent No.: US 8,355,212 B2
(45) Date of Patent: Jan. 15, 2013

(54) LENS UNIT AND IMAGE SENSING APPARATUS INCORPORATED WITH THE SAME

(75) Inventors: Tomohiro Matsumoto, Sakai (JP); Yoshifumi Mitani, Osaka (JP); Yutaka Tsujimoto, Sakai (JP)

(73) Assignee: Konica Minolta Opto, Inc. (JP)

( * ) Notice: Subject to any disclaimer, the term of this patent is extended or adjusted under 35 U.S.C. 154(b) by 346 days.

(21) Appl. No.: 12/710,485

(22) Filed: Feb. 23, 2010

(65) Prior Publication Data

US 2010/0214670 A1 Aug. 26, 2010

(30) Foreign Application Priority Data

Feb. 24, 2009 (JP) ................. 2009-040736

(51) Int. Cl.
G02B 15/14 (2006.01)
(52) U.S. Cl. ...................................... 359/699
(58) Field of Classification Search .......... 359/696–699, 359/702–706, 819–826
See application file for complete search history.

(56) References Cited

U.S. PATENT DOCUMENTS

| | | | | |
|---|---|---|---|---|
| 5,239,417 A | * | 8/1993 | Eguchi et al. | 359/823 |
| 5,701,206 A | * | 12/1997 | Sasaki et al. | 359/704 |
| 7,230,773 B2 | | 6/2007 | Nomura et al. | 359/696 |
| 7,663,810 B2 | * | 2/2010 | Watanabe et al. | 359/696 |

FOREIGN PATENT DOCUMENTS

| | | |
|---|---|---|
| JP | 2003-279827 A | 10/2003 |
| JP | 2005-283677 A | 10/2005 |
| JP | 2006-71844 A | 3/2006 |

* cited by examiner

*Primary Examiner* — Thomas K Pham
*Assistant Examiner* — Vipin Patel
(74) *Attorney, Agent, or Firm* — Cantor Colburn LLP (57) ABSTRACT

In a lens unit 1, and an image sensing apparatus 15 incorporated with the lens unit 1 of the invention, a fixed cylinder 2 is formed with an oblong hole 21 extending in an optical axis direction in a lateral surface of the fixed cylinder 2. A driving force from a driving member such as a motor 12 is transmitted to a gear portion formed on an outer periphery of a cam cylinder 3 by a major axis gear 10 received in the oblong hole 21. Thereby, the cam cylinder 3 is rotated, and a lens holding frame is driven in the optical axis direction for a zoom operation. A pressing member 13 for pressing the major axis gear 10 in the optical axis direction during the zoom operation is provided at an end surface of the major axis gear 10.

18 Claims, 9 Drawing Sheets

LENS UNIT AND IMAGE SENSING APPARATUS INCORPORATED WITH THE SAME

This application is based on Japanese Patent Application No. 2009-040736 filed on Feb. 24, 2009, the contents of which are hereby incorporated by reference.

BACKGROUND OF THE INVENTION AND RELATED ART STATEMENT

1. Field of the Invention

The present invention relates to a lens unit and an image sensing apparatus incorporated with the lens unit, and more particularly to a lens unit for use in a single-eye camera incapable of exchanging a lens unit.

2. Description of the Related Art

The single-eye camera is generally provided with a high-magnification zoom lens unit capable of zooming in a wide range from a wide-angle end to a telephoto end, in view of a point that the single-eye camera is incapable of exchanging a lens unit. In order to realize a high zoom magnification, and reduce the lens barrel length in a retracted state for miniaturization, the lens barrel has plural step portions, and the moving amount of a lens group i.e. the protruding amount of a lens barrel is increased. Further, there is a demand for increasing the speed of protruding the lens barrel. As a result, the pressure angle of a cam or a helicoid is increased. For instance, a zoom magnification such as ten times or thirty times is realized by about ⅓ to ¼ turn of a cam cylinder. On the other hand, the lens diameter and the weight of a first lens group (including a forwardmost lens element) are increased to reduce the focal length on the short focus side for realizing a high zoom magnification.

A multi-stage gear is provided to drive a load whose magnitude has been increased for the above reasons. As a result, backlash resulting from a zoom operation is increased. Normally, in the case where a lens unit is directed upwardly or downwardly, a lens driving mechanism is freely moved within a backlash range of a zoom operation. When the driving mechanism is freely moved, a smooth driving operation for a zoom operation is obstructed, which may lower the commercial value of the lens unit. In a fixed mode where the focal position is fixed, the focal position may be displaced, or a measurement error may be included in distance information for auto-focus control, with the result that a defocus may occur. The drawback becomes conspicuous by an increase in the lens weight, the pressure angle, or a backlash amount resulting from a zoom operation.

To suppress the free movement, there is proposed a method, wherein a guide pin of a cam cylinder is urged by a compression spring, and the guide pin is pressed against the cam cylinder. The technique, however, may increase a load necessary for driving the cam cylinder, and generate dusts resulting from abrasion of the cam cylinder.

As a method for suppressing backlash resulting from a zoom operation, there is proposed a method, wherein a suede cloth is attached e.g. between a cam cylinder and a fixed cylinder to prevent free movement of the cam cylinder by abrasion against the suede cloth. The technique, however, has a drawback that the suede cloth is flattened, and is likely to wear over time.

There are methods as disclosed in JP 2005-283677A (D1) and U.S. Pat. No. 7,230,773 (D2), as other methods for suppressing backlash resulting from a zoom operation. In the methods disclosed in D1 and D2, backlash is eliminated by mounting a coil spring between lens groups. In the methods, however, there is a likelihood that a cam cylinder may be freely moved by a spring force of the coil spring, depending on an arrangement of an optical system. Thus, the methods may be impractical in the case where a change in position between lens groups is relatively large, and obstruct miniaturization.

On the other hand, JP 2003-279827A (D3) discloses eliminating backlash by providing a coil spring of a diameter substantially equal to the diameter of a cam cylinder at an end surface of the cam cylinder, and urging the cam cylinder in the optical axis direction by a spring force of the coil spring.

In the conventional art disclosed in D3, however, it is necessary to provide a coil spring of a diameter substantially equal to the diameter of a cam cylinder. Accordingly, the length of the cam cylinder is unavoidably increased, which not only obstructs miniaturization, but also increases the difficulty in assembling the lens unit. Thus, the method is not desirable in the aspect of productivity.

SUMMARY OF THE INVENTION

In view of the above, it is an object of the present invention to provide a lens unit capable of preventing free movement of a cam cylinder with a simplified arrangement, and an image sensing apparatus incorporated with the lens unit.

In the inventive lens unit and the inventive image sensing apparatus incorporated with the lens unit, a fixed cylinder is formed with an oblong hole extending in an optical axis direction in a lateral surface of the fixed cylinder. A driving force from a driving member is transmitted to a gear portion formed on an outer periphery of a cam cylinder by a major axis gear received in the oblong hole. Thereby, the cam cylinder is rotated, and a lens holding frame is driven in the optical axis direction for a zoom operation. A pressing member for pressing the major axis gear in the optical axis direction during the zoom operation is provided at an end surface of the major axis gear.

The lens unit having the above arrangement, and the image sensing apparatus incorporated with the lens unit enable to prevent free movement of the cam cylinder with a simplified arrangement.

These and other objects, features and advantages of the present invention will become more apparent upon reading the following detailed description along with the accompanying drawings.

DETAILED DESCRIPTION OF THE PREFERRED EMBODIMENTS OF THE INVENTION

In the following, an embodiment of the invention is described referring to the drawings. Elements with like reference numerals throughout the drawings have like arrangements, and repeated description thereof is omitted, as necessary.

Figure 1:
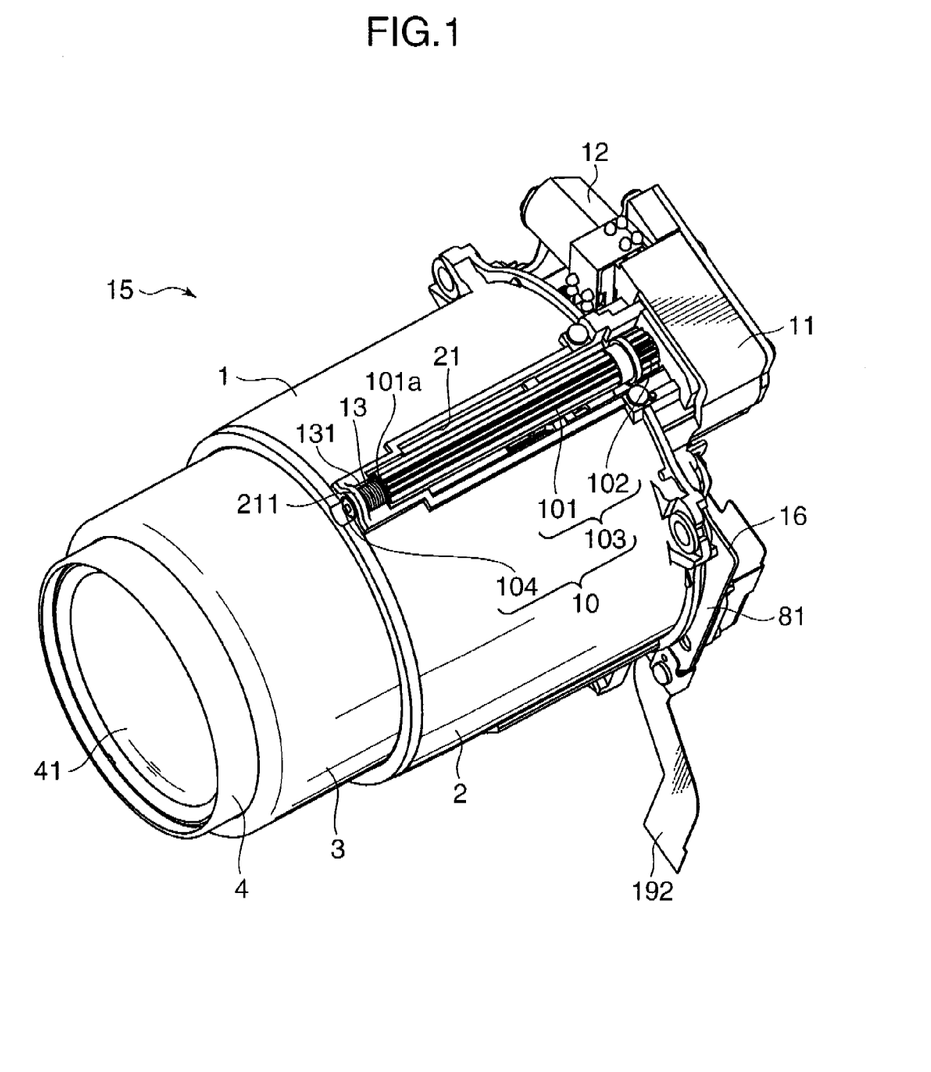
FIG. 1 is a perspective view showing an overall arrangement of an image sensing apparatus incorporated with a lens unit embodying the invention, viewed from a bottom of the image sensing apparatus.
Figure 2:
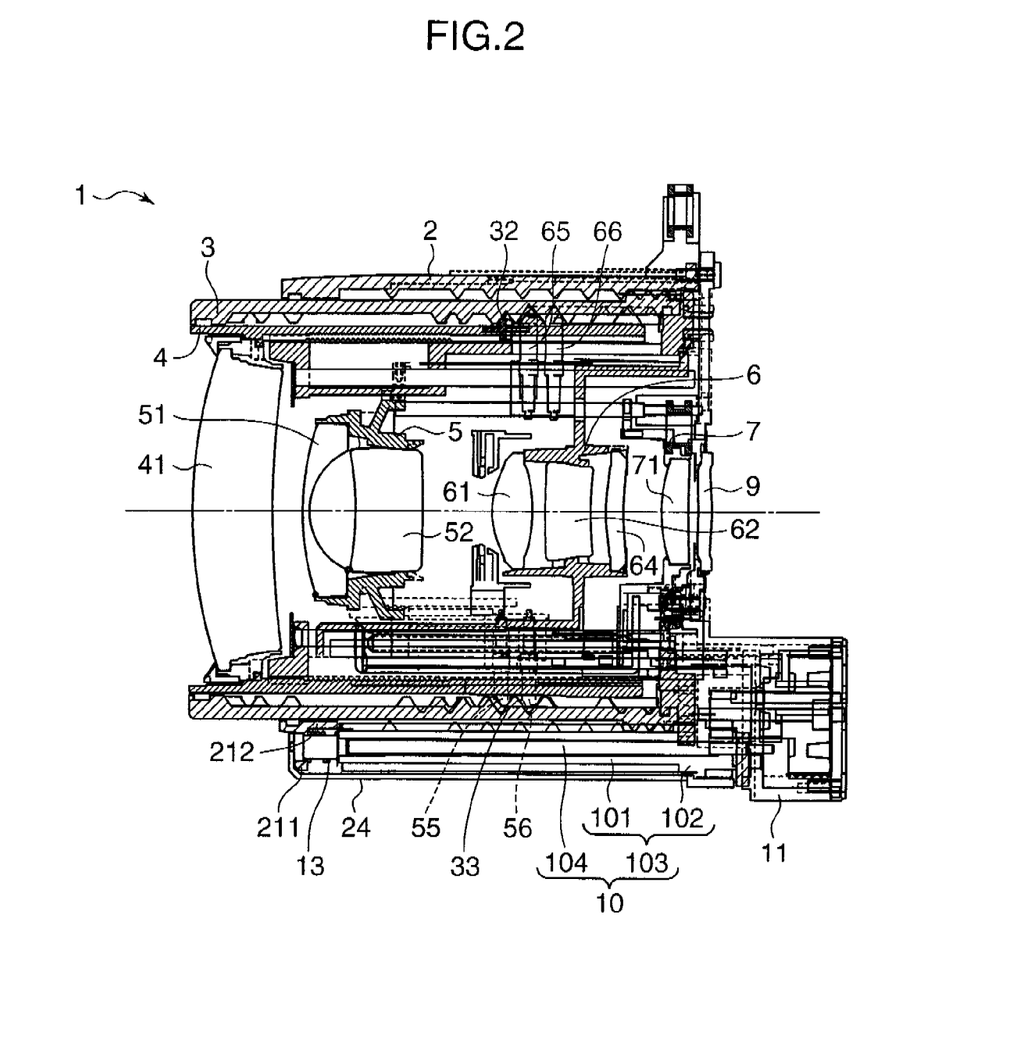
FIG. 2 is an elevational sectional view of the lens unit shown in FIG. 1, specifically showing a state that a lens barrel is retracted.
Figure 3:
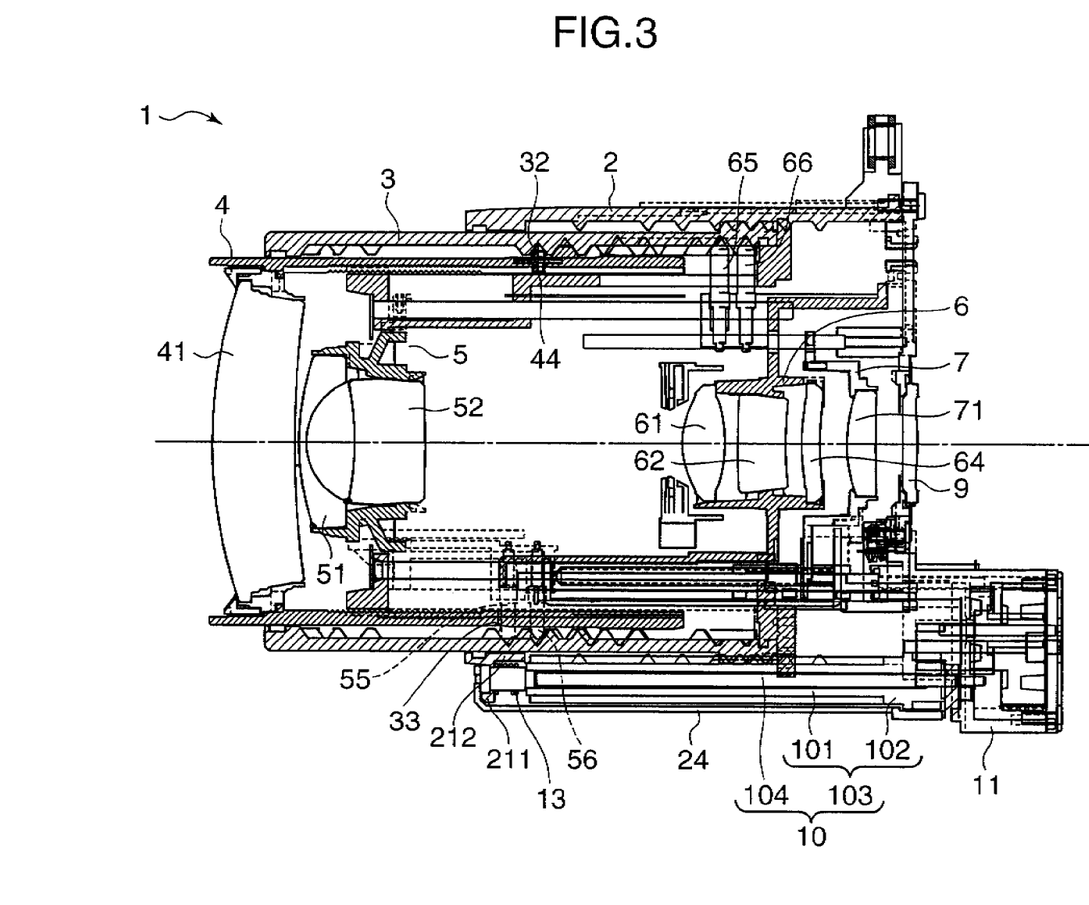
FIG. 3 is an elevational sectional view of the lens unit shown in FIG. 1, specifically showing a state that the lens barrel is shifted to a wide-angle end.
Figure 4:
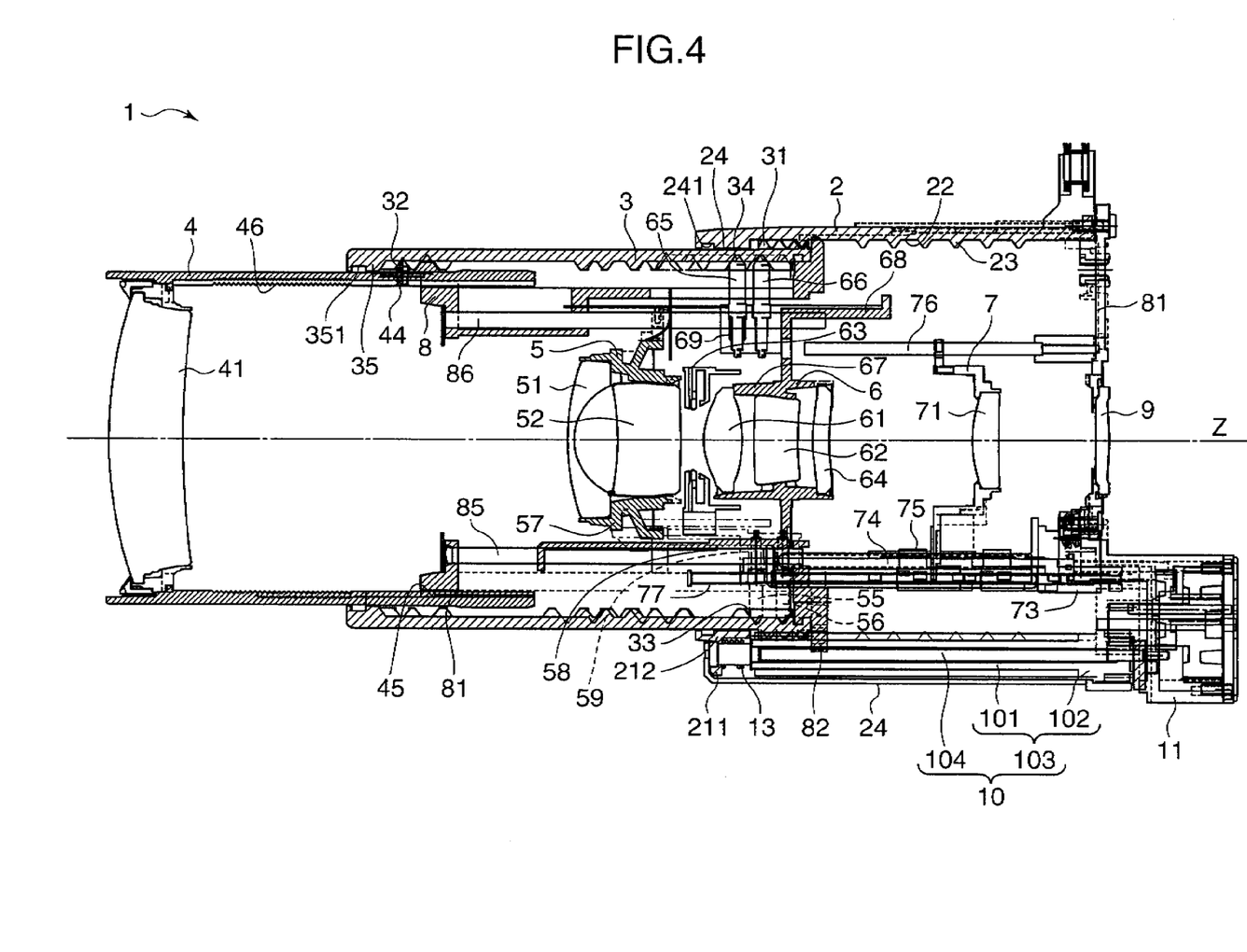
FIG. 4 is an elevational sectional view of the lens unit shown in FIG. 1, specifically showing a state that the lens barrel is shifted to a telephoto end.

FIG. 1 is a perspective view showing an overall arrangement of an image sensing apparatus incorporated with a lens unit embodying the invention. FIGS. 2 through 4 are elevational sectional views of the lens unit shown in FIG. 1. The lens unit 1 is used in an image sensing apparatus incapable of exchanging a lens unit, and is a lens unit having a high zoom magnification and incorporated with an expandable and contractible lens barrel. FIG. 2 shows a state that the lens barrel is in a retracted state, in other words, a non-use state of the image sensing apparatus. FIG. 3 shows a wide-angle end state, wherein the focal length is set to e.g. 26 mm in terms of 35 mm film. FIG. 4 shows a telephoto end state, wherein the focal length is set to e.g. 520 mm in terms of 35 mm film.

In the lens unit 1, the lens barrel is constituted of a fixed cylinder 2, a cam cylinder 3, a lens holding frame 4, a first moving frame 5, a second moving frame 6, a third moving frame 7, and a rectilinear cylinder 8 for supporting the frames 4 through 6. In the example shown in FIG. 2, the lens holding frame 4 holds a first lens group i.e. a forwardmost lens element 41 at a front end of the lens holding frame 4. The first moving frame 5 holds a second lens group i.e. lens elements 51 and 52. The second moving frame 6 holds a third lens group i.e. lens elements 61, 62, and 64. The third moving frame 7 holds a focus lens 71. The lens groups held by the frames 4 through 6 each includes one or more lens elements. A lens element 9 is mounted on a body side of the lens barrel. Out of the fixed cylinder 2, the cam cylinder 3, and the frames 4 through 7, the cam cylinder 3 is housed in the fixed cylinder 2 at the outermost periphery of the lens barrel, the lens holding frame 4 is housed in the cam cylinder 3, and the first moving frame 5 is housed at a substantially forward position within the lens holding frame 4, and the second moving frame 6 is housed at a substantially rearward position within the lens holding frame 4. The third moving frame 7 is housed in the fixed cylinder 2 at a rearward position with respect to the cam cylinder 3 and the frames 4 through 6.

The third moving frame 7 for focus control has a long screw shaft 74, serving as an output shaft of a motor 73 attached to a base member 81. The screw shaft 74 is engaged with an attachment piece 75. With this arrangement, the third moving frame 7 is slidably displaceable in z-axis direction (see FIG. 4), as an optical axis direction. The third moving frame 7 is guided by plural guide pins 76 mounted on the base member 81 in an upright state to be displaceable in z-axis direction.

The third moving frame 7 is urged by a bias spring 77 to prevent backlash in z-axis direction.

The fixed cylinder 2 is formed with an oblong hole 21 extending in z-axis direction in a lateral surface thereof. A major axis gear 10 is provided in the oblong hole 21. The major axis gear 10 has such an axial length as to be received in the oblong hole 21, and has a gear portion 101 in the circumferential direction thereof. The major axis gear 10 is constructed by passing a shaft 104 in a cylindrical body 103 formed by integrally mounting the gear portion 101 and a transmission gear portion 102 formed at a base end of the major axis gear 10. An end of the shaft 104 is held by a bearing 211 formed at one end of the oblong hole 21, and the other end of the shaft 104 is held by a gear box 11. A plurality of reduction gears are housed in the gear box 11. A driving force from a motor 12 is transmitted to the transmission gear portion 102 through the reduction gears to thereby rotate the cylindrical body 103.

A first cam groove 22 is formed in the inner surface of the fixed cylinder 2 in a spiral manner. A base end of the cam cylinder 3 to be housed in the fixed cylinder 2 is formed into a large diametrical portion 31. A gear portion to be engaged with the gear portion 101 of the major axis gear 10, and a spiral groove engageable with a projection 23 constituting the first cam groove 22 are formed on the outer surface of the large diametrical portion 31. The cam cylinder 3 is helicoid-connected to the fixed cylinder 2. A base end of the cam cylinder 3 is supported by the fixed cylinder 2 at the large diametrical portion 31. A front end portion of the fixed cylinder 2 slidably holds the cam cylinder 3, and prevents intrusion of dusts by an unillustrated suede cloth to be attached to a rib 24, and a concave groove 241 formed in the rib 24.

A second cam groove 32 is formed at a forward position of the inner surface of the cam cylinder 3 in a spiral manner. A base end of the cam cylinder 3 is spirally and circumferentially divided into a third cam groove 33 and a fourth cam groove 34. The lens holding frame 4 to be housed in the cam cylinder 3 has guide pins 44 to be received in the second cam groove 32 circumferentially and equi-distantly with an interval of 120° on the outer surface of a base end thereof in correspondence to the above arrangement. A groove 45 extending in z-axis direction is formed in the inner surface of the lens holding frame 4. The rectilinear cylinder 8 is rectilinearly guided by engagement of a projection 81 of the rectilinear cylinder 8 in the groove 45. The rectilinear cylinder 8 is rectilinearly guided with respect to the fixed cylinder 2, and is axially held with the cam cylinder 3. The lens holding frame 4 is axially driven by a differential between rotation of the cam cylinder 3 and rectilinear control of the rectilinear cylinder 8.

In the above arrangement, the lens holding frame 4 is rectilinearly moved in z-axis direction in accordance with rotation of the cam cylinder 3, without rotating about an axis of rotation thereof. Similarly to the cam cylinder 3, the lens holding frame 4 is slidably held by the cam cylinder 3, and intrusion of dusts is prevented by an unillustrated suede cloth to be attached to a rib 35 formed on a front end of the cam cylinder 3, and a concave recess 351 formed in the rib 35. Light blocking projections and recesses 46 are formed on the inner surface of a front end of the lens holding frame 4 to prevent in-plane reflection.

The rectilinear cylinder 8 is housed in the lens holding frame 4, while the lens unit 1 is shifted from a retracted state shown in FIG. 2 to a wide-angle end state shown in FIG. 3. The first moving frame 5 and the second moving frame 6 are respectively housed at a forward position and a rearward position within the rectilinear cylinder 8. A flange projection 82 to be received in the oblong hole 21 is formed on a base end of the rectilinear cylinder 8. With this arrangement, as described above, rotation of the rectilinear cylinder 8 is prevented, and only the rectilinear movement of the rectilinear cylinder 8 in z-axis direction is allowed. The movement of the rectilinear cylinder 8 is performed in cooperation with the movement of the first moving frame 5 to be described later.

Guide pins 55 and 56 of the first moving frame 5 are received in the third cam groove 33 of the cam cylinder 3. Likewise, guide pins 65 and 66 of the second moving frame 6 are received in the fourth cam groove 34 of the cam cylinder 3. A holder 57 for holding the lens elements 51 and 52 at the forward position of the first moving frame 5 is housed in the rectilinear cylinder 8. A holder 67 for holding the lens elements 61, 62, and 64 at the rearward position of the second moving frame 6 is housed in the rectilinear cylinder 8. Cylindrical portions 58 and 68 respectively extending from the holders 57 and 67 are concentrically arranged in the rectilinear cylinder 8. The first moving frame 5 and the second moving frame 6 respectively slide along guide shafts 85 and 86 provided in the rectilinear cylinder 8 so that the first moving frame 5 and the second moving frame 6 are only allowed to be rectilinearly moved in z-axis direction. The second moving frame 6 is also provided with a shutter unit 63 at the forward position of the lens element 61. The shutter unit 63 serves as a shutter and an aperture.

In this example, out of the guide pins 55 and 56; 65 and 66, the rear-side guide pins 56 and 66 are fixed to the cylindrical portions 58 and 68, respectively, and the forward-side guide pins 55 and 65 are urged radially outwardly by springs 59 and 69, respectively. Normally, the forward-side guide pins 55 and 65 are slidably urged by the springs 59 and 69 within the third cam groove 33 and the fourth cam groove 34, respectively, and the rear-side guide pins 56 and 66 hardly contact with the third cam groove 33 and the fourth cam groove 34, respectively. However, when a large impact is applied, the rear-side guide pins 56 and 66 respectively stay in the third cam groove 33 and the fourth cam groove 34 to thereby prevent disengagement of the guide pins 56 and 66.

Figure 6:
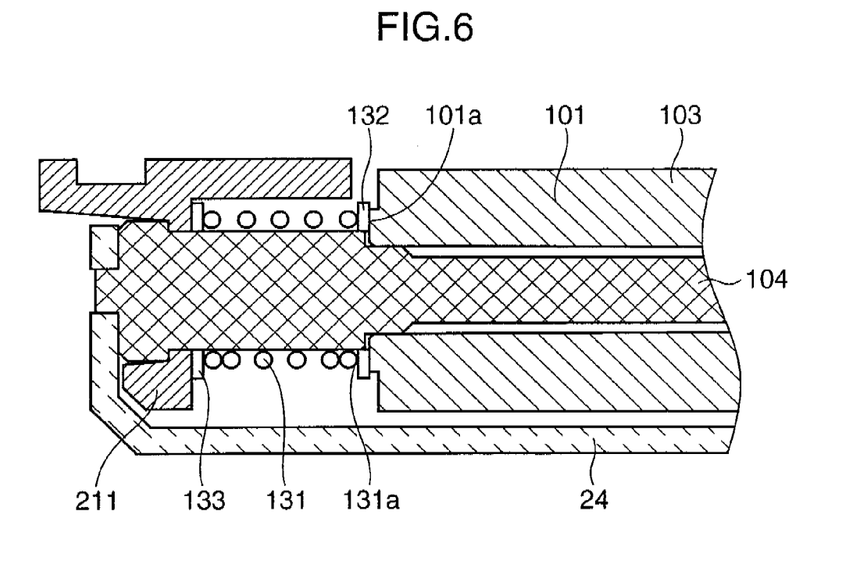
FIG. 6 is a cross-sectional view for describing a structure of preventing free movement of a cam cylinder, as a first example of the embodiment.
Figure 7:
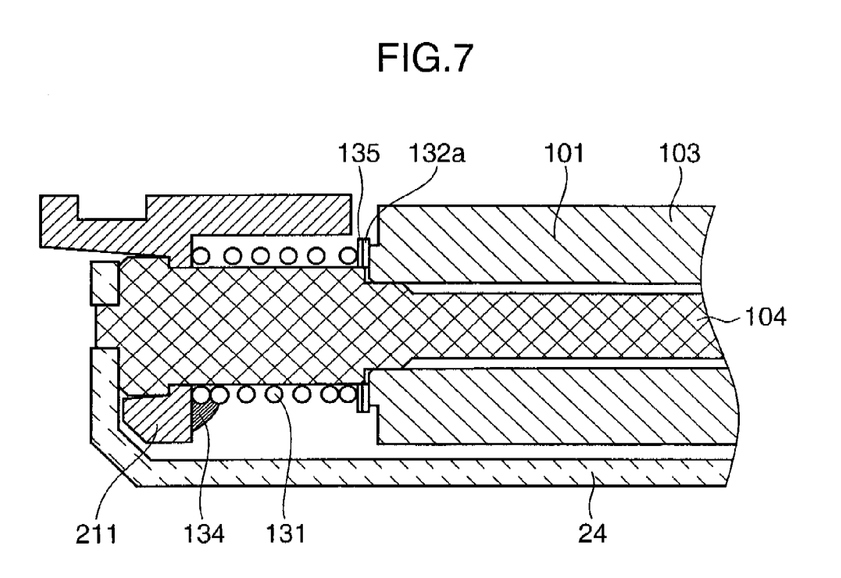
FIG. 7 is a cross-sectional view for describing a structure of preventing free movement of a cam cylinder, as a second example of the embodiment.
Figure 8:
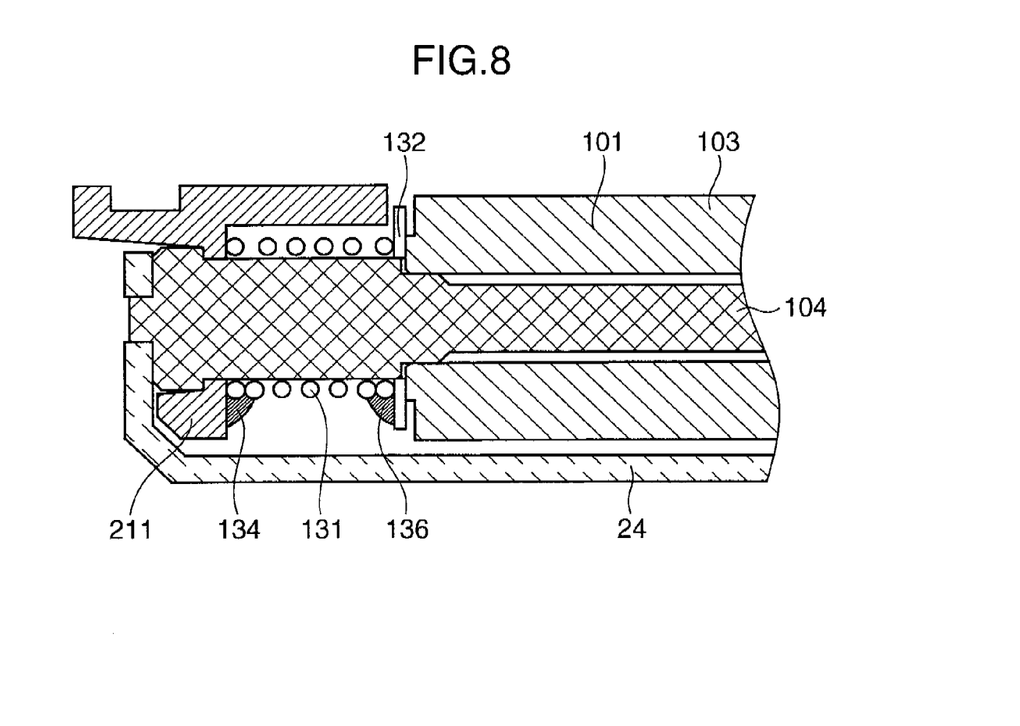
FIG. 8 is a cross-sectional view for describing a structure of preventing free movement of a cam cylinder, as a third example of the embodiment.
Figure 9:
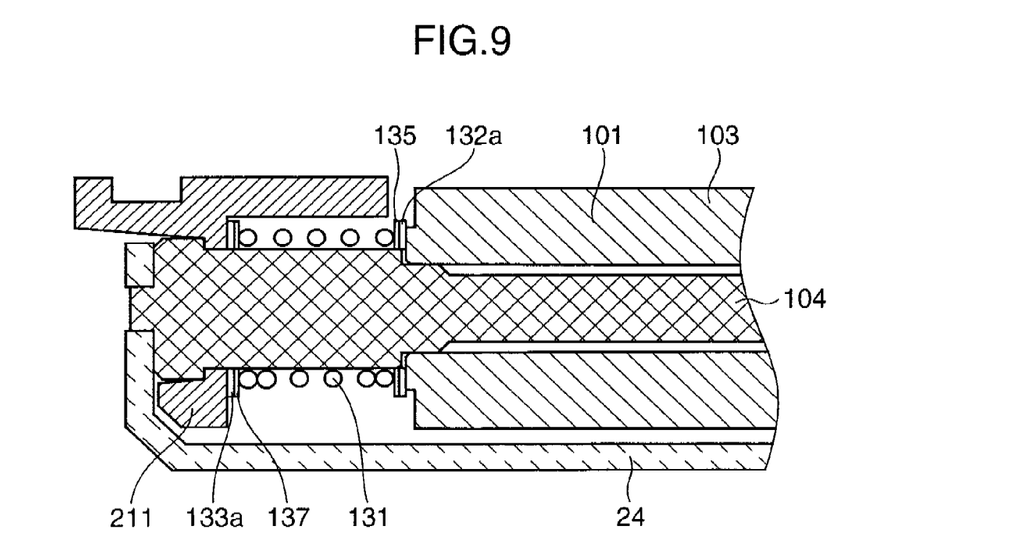
FIG. 9 is a cross-sectional view for describing a structure of preventing free movement of a cam cylinder, as a fourth example of the embodiment.

The lens unit 1 having the above arrangement has a feature that a pressing member 13 for pressing the major axis gear 10 in z-axis direction is provided at an end surface 101a of the gear portion 101 of the major axis gear 10. Various examples of the pressing member 13 using a compression coil spring 131 as a primary member are proposed. For instance, as shown in FIG. 6, washers 132 and 133 are provided at both ends of the compression coil spring 131. For instance, as shown in FIG. 7, an end of the compression coil spring 131 corresponding to a bearing 211 is fixed by an adhesive agent 134, and a washer at the other end of the compression coil spring 131 corresponding to the major axis gear 10 is configured into a resin washer 132a, and an adhesive agent 135 is coated on the resin washer 132a to fix the resin washer 132a. For instance, as shown in FIG. 8, an end of the compression coil spring 131 corresponding to a bearing 211 is fixed by an adhesive agent 134, and the other end of the compression coil spring 131 corresponding to the major axis gear 10 is fixed through a washer 132 by an adhesive agent 136. For instance, as shown in FIG. 9, washers at both ends of the compression coil spring 131 are configured into resin washers 132a and 133a, and adhesive agents 135 and 137 are respectively coated on the resin washers 132a and 133a. Any one of the above arrangements is applied to construct the pressing member 13.

Specifically, one end of the compression coil spring 131 is contacted with the end surface 101a of the major axis gear 10 through the washer 132 (see FIG. 6 or 8) or the washer 132a (see FIG. 7 or 9) to urge the major axis gear 10 toward the base end of the lens unit 1. The other end of the compression coil spring 131 is contacted with the bearing 211 through the washer 133 (see FIG. 6) or the washer 133a (see FIG. 9), or adhesively fixed to the bearing 211 by the adhesive agent 134 (see FIG. 7 or 8). The adhesive agents 134 and 136 have flexibility, and are free from a drawback that the compression coil spring 131 may be rotated resulting from peeling off of the adhesive agent due to aging curing. Also, there is no likelihood that the adhesive agent may seriously affect expansion and contraction of the compression coil spring 131. When the major axis gear 10 is received in the oblong hole 21, the oblong hole 21 is covered by a covering member 24.

In the lens unit 1 of the embodiment, there is provided the pressing member 13 for pressing the end surface of the gear portion 101 of the major axis gear 10 in z-axis direction for driving the cam cylinder 3 to realize a high magnification zoom operation. Thereby, a frictional force is generated, which enables to suppress rotation of the major axis gear 10 resulting from the weight of a moving lens. Specifically, the major axis gear 10 is urged toward the base end of the lens unit 1 by the pressing member 13, and engagement between the major axis gear 10 and the gear portion of the cam cylinder 3 is maintained. In other words, the lens unit 1 of the embodiment enables to suppress positional displacement i.e. backlash of various parts from the motor 12 to the major axis gear 10 with a compact and simplified arrangement, and prevent free movement of the cam cylinder 3. Further, the lens unit 1 of the embodiment eliminates the need of unduly increasing the pressing force of the guide pins 55 and 65, thereby realizing a smooth operation of the lens unit 1.

In the lens unit 1 of the embodiment, the pressing member 13 is constructed by using the compression coil spring 131 as a primary member. This enables to construct the pressing member 13 with a compact and simplified arrangement.

In the lens unit 1 of the embodiment, the washer 132 (see FIG. 6 or 8) or the washer 132a (see FIG. 7 or 9) is provided between an end surface 131a of the compression coil spring 131, and the end surface 101a of the major axis gear 10. This enables to prevent abrasion of the end surface 101a of the major axis gear 10, and generation of noises (squeaky sounds).

In the above arrangement, the compression coil spring 131 provided between the inner wall of the oblong hole 21 and the end surface 101a of the major axis gear 10 is kept unmoved. The compression coil spring 131 will be unstable, if friction is generated on the side of the major axis gear 10, or the compression coil spring 131 is rotated in association with the major axis gear 10, in other words, friction is generated on the side of the oblong hole 21. In view of the above, in the lens unit 1 of the embodiment, one end of the compression coil spring 131 is adhesively fixed to the bearing 211 on the side of the oblong hole 21. This enables to generate friction only at the end surface 101a of the major axis gear 10 to thereby realize a stable operation.

Figure 5:
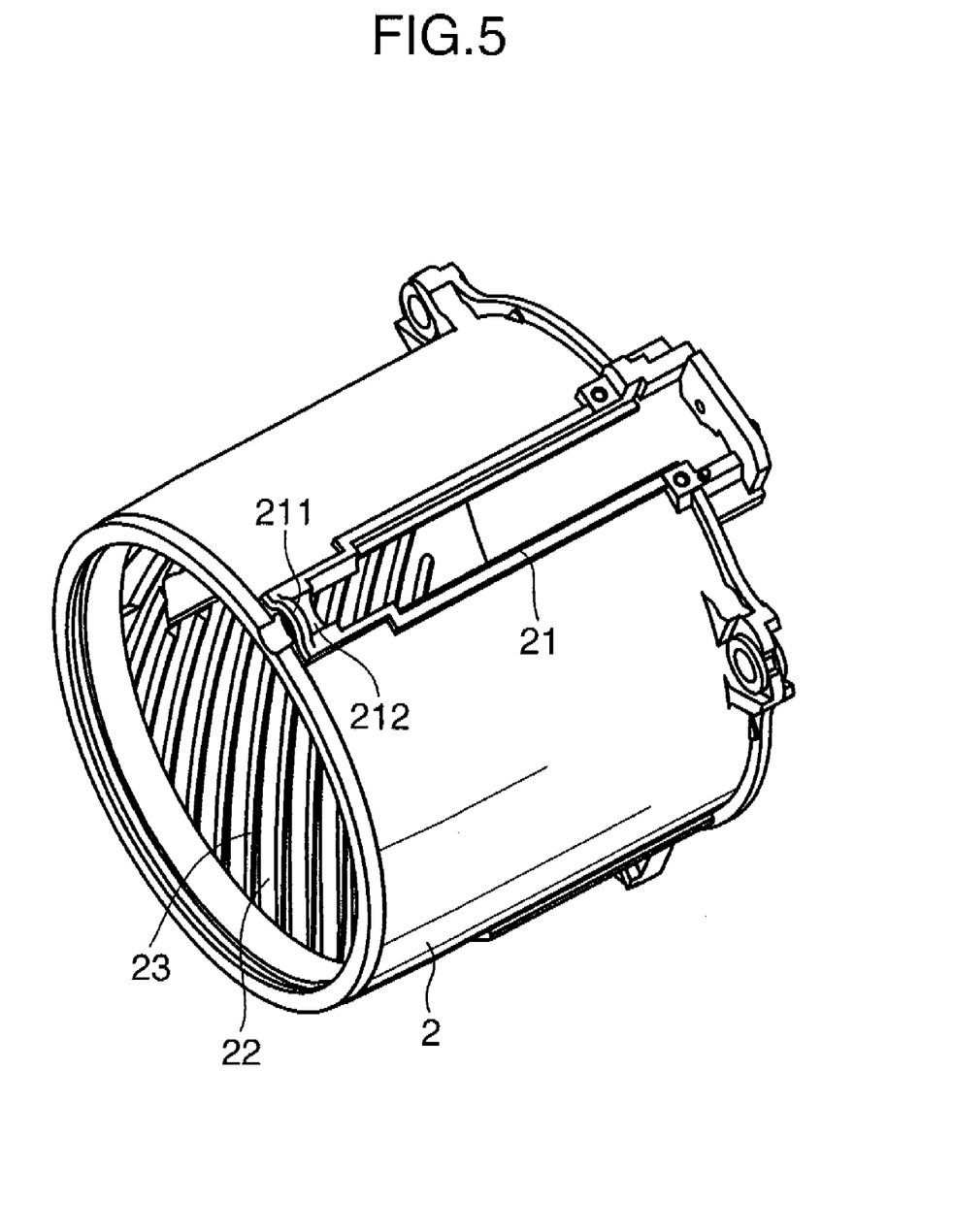
FIG. 5 is a perspective view showing a fixed cylinder mounted at an outermost periphery of the lens barrel of the lens unit shown in FIG. 1.

In the case where the adhesive agent 134 is used as shown in FIGS. 7 and 8, as shown in FIG. 5, a cover plate 212 is formed on the fixed cylinder 2 at a position corresponding to the oblong hole 21. The cover plate 212 is formed along the outer surface of the compression coil spring 131 and at a position close to the optical axis. With this arrangement, the lens unit 1 of the embodiment enables to prevent drooping of the adhesive agent 134 onto the cam cylinder 3 provided inside the fixed cylinder 2 at the time of adhesive fixation of the bearing 211 with the compression coil spring 131. The lens unit 1 of the embodiment also enables to prevent falling of the compression coil spring 131 into the oblong hole 21 at the time of an assembling operation. Alternatively, the pressing member 13 may be an annular member made of a material having elasticity such as polyurethane or felt.

Figure 10:
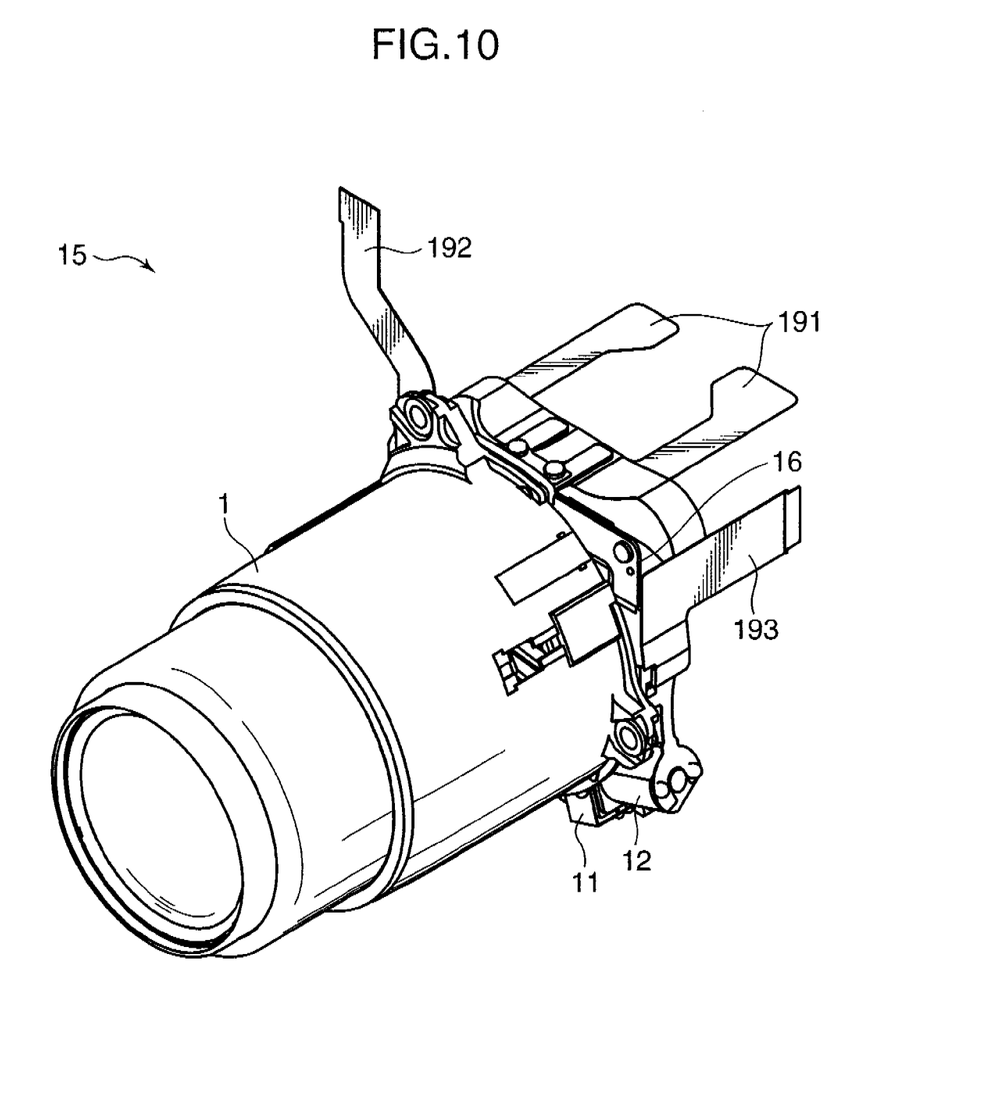
FIG. 10 is a perspective view of the image sensing apparatus shown in FIG. 1, specifically, a top plan view.
Figure 11:
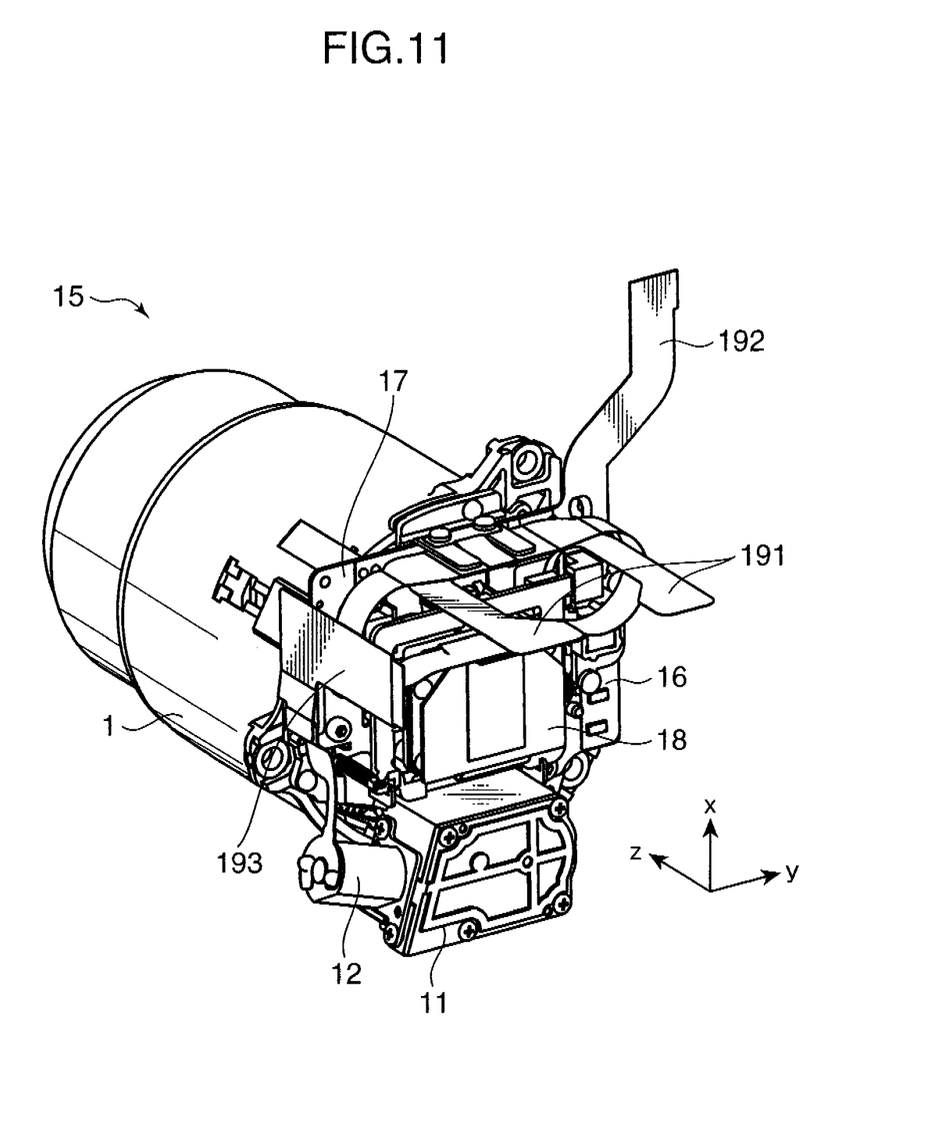
FIG. 11 is a perspective view of the image sensing apparatus shown in FIG. 1, specifically, a rear view.

FIGS. 10 and 11 are perspective views of an image sensing apparatus 15 incorporated with the lens unit 1 having the above arrangement. FIG. 1 is a bottom plan view of the image sensing apparatus 15. FIG. 10 is a top plan view of the image sensing apparatus 15, and FIG. 11 is a rear view of the image sensing apparatus 15. The image sensing apparatus 15 is constituted of the lens unit 1, and an image blur correcting unit 16 to be housed in an unillustrated body casing.

The image blur correcting unit 16 is constructed by loading a sensor unit 18 on a substrate 17 mounted with the lens unit 1. The sensor unit 18 is slidably and displaceably supported in x-axis direction and y-axis direction (see FIG. 11) by an ultrasonic actuator in such a manner as to cancel an image blur resulting from trembling of the hand(s) to be detected by a gyro sensor. A signal is inputted to and outputted from the sensor unit 18 by an FPC 191, a signal is inputted to and outputted from the ultrasonic actuator and the gyro sensor for image blur correction by an FPC 192, and the motor 12 for zoom control and the motor 73 for focus control are driven through the FPC 191.

Thus, use of the lens unit 1 enables to configure the image sensing apparatus 15 into a high magnification image sensing apparatus capable of suppressing free movement of a lens barrel.

The specification discloses the aforementioned arrangements. The following is a summary of the primary arrangements of the embodiment.

A lens unit according to an aspect is an expandable and contractible multi-stage lens unit for moving a plurality of lens groups in the optical axis direction. The lens unit includes a lens holding frame which holds a lens element; a fixed cylinder formed with an oblong hole in one lateral surface thereof, the oblong hole extending in the optical axis direction; a cam cylinder movable in the optical axis direction and rotatably held in the fixed cylinder, the cam cylinder including a gear portion on an outer surface of a base end thereof to drive the lens holding frame in the optical axis direction; a major axis gear having such a length in the optical axis direction as to be received in the oblong hole, the major axis gear being engageable with the gear portion of the cam cylinder; a driving member which rotates the major axis gear by way of a plurality of gears; and a pressing member provided on an end surface of the major axis gear, and adapted to press the major axis gear in the optical axis direction.

In the lens unit having the above arrangement, the cam cylinder which is e.g. helicoid-connected to the fixed cylinder is rotatably projected and retracted. Thereby, the plural lens groups are moved in the optical axis direction. Thus, in the multi-stage lens unit capable of performing a zoom operation at a relatively high magnification, an oblong hole extending in the optical axis direction is formed in the one lateral surface of the fixed cylinder, and a driving force from a driving member such as a motor is transmitted to the gear portion of the cam cylinder exposed through the oblong hole by the major axis gear received in the oblong hole. Thereby, the cam cylinder is rotated, and the lens holding frame is driven in the optical axis direction. The pressing member for pressing the major axis gear in the optical axis direction is provided at the end surface of the major axis gear for a zoom operation.

In the lens unit having the above arrangement, positional displacement i.e. backlash of various parts from the driving member such as a motor to the major axis gear can be suppressed with a compact and simplified arrangement, and free movement of the cam cylinder can be prevented. In the lens unit having the above arrangement, a guide pin is received in a cam grove of the cam cylinder. In this arrangement, in the case where the lens unit is further provided with a moving frame for movably holding the other zoom lens to be loaded, there is no need of unduly increasing a pressing force of the guide pin with respect to the moving frame by engagement of the guide pin in the cam groove of the cam cylinder. This enables to realize a smooth operation of the moving frame.

In the lens unit, preferably, the pressing member may be a coil spring.

In the lens unit having the above arrangement, the pressing member can be constructed with a compact and simplified arrangement.

Preferably, the lens unit may further include a washer provided between an end surface of the coil spring, and the end surface of the major axis gear.

In the lens unit having the above arrangement, abrasion of the end surface of the major axis gear, and generation of noises (squeaky sounds) can be prevented.

In the lens unit, preferably, an end surface of the coil spring and an inner wall of the oblong hole may be adhesively fixed to each other.

In the lens unit having the above arrangement, the coil spring provided between the inner wall of the oblong hole and the end surface of the major axis gear is kept unmoved. The coil spring will be unstable, if friction is generated on the side of the major axis gear, or the coil spring is rotated in association with the major axis gear, in other words, friction is generated on the side of the oblong hole. In view of the above, in the lens unit of the embodiment, the compression coil spring is adhesively fixed to the inner wall of the oblong hole.

The lens unit having the above arrangement enables to generate friction only at the end surface of the major axis gear to thereby realize a stable operation.

In the lens unit, preferably, the fixed cylinder may be formed with a cover portion along an outer surface of the coil spring at a position close to the optical axis.

In the lens unit having the above arrangement, there can be prevented drooping of an adhesive agent onto the cam cylinder provided inside the fixed cylinder at the time of adhesive fixation of the coil spring with the oblong hole.

In the lens unit, preferably, the cam cylinder may be rotatably driven to be projected and retracted by a helicoid connection with the fixed cylinder.

Preferably, the lens unit may further include a rectilinear cylinder rotatably and axially driven with the cam cylinder, and adapted to be rectilinearly guided with respect to the fixed cylinder, wherein the lens holding frame holds the lens element at a front end of the lens holding frame, and is projected and retracted by a differential between the cam cylinder and the rectilinear cylinder.

Preferably, the lens unit may further include a moving frame housed in the rectilinear cylinder, the moving frame including a guide portion engageable in a cam groove formed in an inner surface of the cam cylinder, wherein the moving frame holds the lens element.

Preferably, the lens unit may further include a moving frame housed in the rectilinear cylinder, the moving frame including a guide portion engageable in a cam groove formed in an inner surface of the cam cylinder, wherein the moving frame holds a light amount adjuster.

An image sensing apparatus according to another aspect of the invention includes the lens unit having one of the above arrangements, and an image sensor which converts an optical image formed by the lens unit into an electrical signal.

The image sensing apparatus having the above arrangement enables to realize a high magnification image sensing apparatus without free movement of a lens barrel.

Although the present invention has been fully described byway of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A lens unit comprising:
a lens holding frame which holds a lens element;
a fixed cylinder formed with an oblong hole in one lateral surface thereof, the oblong hole extending in a direction of an optical axis of the lens unit;
a cam cylinder moveable in the optical axis direction and rotatably held in the fixed cylinder, the cam cylinder including a gear portion on an outer surface of a base end thereof to drive the lens holding frame in the optical axis direction;
a major axis gear having such a length in the optical axis direction as to be received in the oblong hole, the major axis gear being engageable with the gear portion of the cam cylinder;
a driving member which rotates the major axis gear by way of a plurality of gears; and
a pressing member provided on an end surface of the major axis gear, and adapted to press the major axis gear in the optical axis direction, and structured to generate a friction force on the end surface of the major axis gear,
wherein the friction force prevents a free movement of the cam cylinder when the lens unit is directed upwardly or downwardly, and allows a movement of the lens holding frame in the optical axis direction when the driving member rotates the major axis gear by way of the plurality of gears.

2. The lens unit according to claim 1, wherein the pressing member comprises a coil spring.

3. The lens unit according to claim 2, further comprising a washer provided between an end surface of the coil spring, and the end surface of the major axis gear.

4. The lens unit according to claim 2, wherein an end surface of the coil spring and an inner wall of the oblong hole are adhesively fixed to each other.

5. The lens unit according to claim 4, wherein the fixed cylinder is formed with a cover portion along an outer surface of the coil spring at a position close to the optical axis.

6. The lens unit according to claim 1, wherein the cam cylinder is rotatably driven to be projected and retracted by a helicoid connection with the fixed cylinder.

7. The lens unit according to claim 1, further comprising:
a rectilinear cylinder rotatably and axially driven with the cam cylinder, and adapted to be rectilinearly guided with respect to the fixed cylinder,
wherein the lens holding frame holds the lens element at a front end of the lens holding frame, and is projected and retracted by a differential between the cam cylinder and the rectilinear cylinder.

8. The lens unit according to claim 7, further comprising:
a moving frame housed in the rectilinear cylinder, the moving frame including a guide portion engageable in a cam groove formed in an inner surface of the cam cylinder, wherein the moving frame holds the lens element.

9. The lens unit according to claim 7, further comprising:
a moving frame housed in the rectilinear cylinder, the moving frame including a guide portion engageable in a cam groove formed in an inner surface of the cam cylinder, wherein the moving frame holds a light amount adjuster.

10. An image sensing apparatus comprising:
a lens unit; and
an image sensor which converts an optical image formed by the lens unit into an electrical signal,
the lens unit including:
a lens holding frame which holds a lens element;
a fixed cylinder formed with an oblong hole in one lateral surface thereof, the oblong hole extending in a direction of an optical axis of the lens unit;
a cam cylinder movable in the optical axis direction and rotatably held in the fixed cylinder, the cam cylinder including a gear portion on an outer surface of a base end thereof to drive the lens holding frame in the optical axis direction;
a major axis gear having such a length in the optical axis direction as to be received in the oblong hole, the major axis gear being engageable with the gear portion of the cam cylinder;
a driving member which rotates the major axis gear by way of a plurality of gears; and
a pressing member provided on an end surface of the major axis gear, and adapted to press the major axis gear in the optical axis direction, and structured to generate a friction force on the end surface of the major axis gear,
wherein the friction force prevents a free movement of the cam cylinder when the lens unit is directed upwardly or downwardly, and allows a movement of the lens holding frame in the optical axis direction when the driving member rotates the major axis gear by way of the plurality of gears.

11. The image sensing apparatus according to claim 10, wherein the pressing member comprises a coil spring.

12. The image sensing apparatus according to claim 11, further comprising a washer provided between an end surface of the coil spring, and the end surface of the major axis gear.

13. The image sensing apparatus according to claim 11, wherein an end surface of the coil spring and an inner wall of the oblong hole are adhesively fixed to each other.

14. The image sensing apparatus according to claim 13, wherein the fixed cylinder is formed with a cover portion along an outer surface of the coil spring at a position close to the optical axis.

15. The image sensing apparatus according to claim 10, wherein the cam cylinder is rotatably driven to be projected and retracted by a helicoid connection with the fixed cylinder.

16. The image sensing apparatus according to claim 10, further comprising:
a rectilinear cylinder rotatably and axially driven with the cam cylinder, and adapted to be rectilinearly guided with respect to the fixed cylinder, wherein
the lens holding frame holds the lens element at a front end of the lens holding frame, and is projected and retracted by a differential between the cam cylinder and the rectilinear cylinder.

17. The image sensing apparatus according to claim 16, further comprising:
a moving frame housed in the rectilinear cylinder, the moving frame including a guide portion engageable in a cam groove formed in an inner surface of the cam cylinder, wherein
the moving frame holds the lens element.

18. The image sensing apparatus according to claim 16, further comprising:
a moving frame housed in the rectilinear cylinder, the moving frame including a guide portion engageable in a cam groove formed in an inner surface of the cam cylinder, wherein the moving frame holds a light amount adjuster.

* * * * *